United States Patent
Shouji et al.

[11] Patent Number: 5,820,779
[45] Date of Patent: Oct. 13, 1998

[54] POLYMERIC OPTICAL LOW-PASS FILTER AND DEVICE THEREOF

[75] Inventors: Masuhiro Shouji; Takeo Ogihara; Hiroki Katono; Teruo Sakagami, all of Iwaki; Hiroshi Hasebe, Urawa; Haruyoshi Takatu, Higasiyamato, all of Japan

[73] Assignees: Kureha Kagaku Kogyo Kabushiki Kaisha; Dainippon Ink and Chemicals, Inc., both of Tokyo, Japan

[21] Appl. No.: 538,965

[22] Filed: Oct. 5, 1995

[30] Foreign Application Priority Data

Oct. 18, 1994 [JP] Japan ..................... 6-277263

[51] Int. Cl.$^6$ ................. G02B 5/20; G02B 1/04
[52] U.S. Cl. ............. 252/299.01; 349/104; 349/185; 349/191; 349/193; 252/299.63; 428/1
[58] Field of Search ............ 428/1; 252/299.01, 252/299.63; 349/183, 191, 193, 104

[56] References Cited

U.S. PATENT DOCUMENTS

| | | | |
|---|---|---|---|
| 5,091,795 | 2/1992 | Nishioka et al. | 349/1 |
| 5,578,243 | 11/1996 | Mazaki et al. | 252/299.01 |

FOREIGN PATENT DOCUMENTS

| | | |
|---|---|---|
| 0 397 263 | 11/1990 | European Pat. Off. |
| 0617111 | 9/1994 | European Pat. Off. |
| 62-284330 | 12/1987 | Japan |
| 63-91620 | 4/1988 | Japan |
| 5-9767 | 2/1993 | Japan |
| 5-64326 | 9/1993 | Japan |
| WO 85/04730 | 10/1985 | WIPO |

OTHER PUBLICATIONS

Patent Abstracts of Japan, vol. 017, No. 654 (P–1653), 3 Dec. 1993 of JP–A–05 215921 (Optrex Corp), 27 Aug. 1993.
Patent Abstracts of Japan, vol. 018, No. 657 (P–1842), 13 Dec. 1994 of JP–A–06 258620 (Seiko Epson Corp), 16 Sep. 1994.
Patent Abstracts of Japan, vol. 012, No. 16 (P–656), 19 Jan. 1988 of JP–A–62 172319 (Canon), 29 Jul. 1987.
Engel, M. et al. (1985) Pure & Appl. Chem. 57(7), 1009–1014.
WPIDS AN 93–305932—abstract of Hoshino, JP5–215, 921.

*Primary Examiner*—Mark Nagumo
*Attorney, Agent, or Firm*—Frishauf, Holtz, Goodman, Langer & Chick, P.C.

[57] ABSTRACT

A polymeric optical low-pass filter of the birefringent type is provided which is lightweight and small, and which can be easily produced. Also provided are a polymeric optical low-pass filter device including the polymeric optical low-pass filter; and a composite optical filter including the polymeric optical low-pass filter. The optical low-pass filter comprises an optically anisotropic polymer film in which the displacement distance S between the ordinary ray and the extraordinary ray represented by the following formula is 1–70 μm:

$$S=\{(b^2-a^2)/2c^2\}\cdot\sin 2\phi e,$$

wherein $a=1/n_e$, $b=1/n_0$, $c^2=a^2 \sin^2\phi+b^2 \cos^2\phi$, $n_e$ is the extraordinary-ray refractive index, $n_0$ is the ordinary-ray refractive index, $\phi$ is the angle formed between the normal at the plane of incidence of light from a subject and the optic axis of the polymer film, and e is the thickness of the polymer film.

19 Claims, 2 Drawing Sheets

F I G. 3
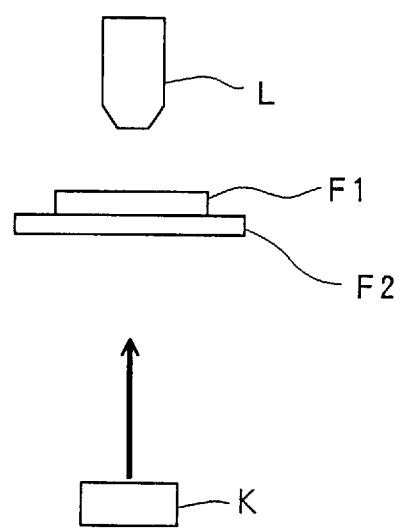

POLYMERIC OPTICAL LOW-PASS FILTER AND DEVICE THEREOF

BACKGROUND OF THE INVENTION

1) Field of the Invention

The present invention relates to an optical low-pass filter suitable for use in imaging devices and the like composed of, for example, CCDs (charge coupled devices), MOS (metal oxide semiconductor) devices and/or the like, and more particularly to a polymeric optical low-pass filter of the birefringence type.

The present invention also relates to a device including the polymeric optical low-pass filter and to a production process thereof, and moreover to a composite optical filter composed of a lamination of the polymeric optical low-pass filter and a luminosity factor-compensating optical filter.

2) Description of the Background Art

In an imaging optical system using imaging devices composed of CCDs and/or MOS devices, an optical low-pass filter is generally used in order to limit a high spatial frequency component of light from a subject to remove color components different from that of the subject, which are attendant on the generation of false signals.

As such an optical low-pass filter, there has heretofore been often used a low-pass filter of the birefringent type making good use of its optical low-pass filtering property due to the separation of ordinary ray and extraordinary ray in a birefringent substance, for example, quartz.

In order to achieve the intended spatial cutoff frequency in an optical low-pass filter of the birefringent type, it is however important that a displacement distance between an ordinary ray and an extraordinary ray is established suitably.

In a lamellar optically anisotropic device, a displacement distance S between an ordinary ray and an extraordinary ray is represented by the following equation (1) ("Crystal Optics", p. 198; Morikita Publisher):

$$S=\{(b^2-a^2)/2c^2\}\cdot\sin 2\phi\cdot e \quad (1)$$

( $a=1/n_e$,
$b=1/n_0$,
$c^2=a^2 \sin^2\phi+b^2 \cos^2\phi$,
$n_e$: an extraordinary-ray refractive index,
$n_0$: an ordinary-ray refractive index,
$\phi$: an angle formed between a normal at a plane of incidence of light from a subject and an optic axis (slow axis) of the lamellar optically anisotropic device, and
e: a thickness of the lamellar optically anisotropic device).

As apparent from the equation (1), in the optical low-pass filter having a fixed displacement distance S, the thickness of the filter becomes smaller as the degree of anisotropy of refractive index ($n_e-n_o$) of a material making up the optical low-pass filter is greater, and an angle (hereinafter may referred to as "oriented angle") $\phi$ formed between a normal at a plane of incidence of light from a subject and an optic axis (slow axis) of the optical low-pass filter is 45 degrees or so.

In order to obtain an optical low-pass filter of the birefringent type, which is small in size, it is therefore desirable that a material great in anisotropy of refractive index and having an oriented angle of 45 degrees or so be used as a base material for the optical low-pass filter.

A quartz plate has heretofore been used as one of the base materials for optical low-pass filters. This quartz plate is obtained by synthesizing a single crystal of quartz and subjecting this single crystal to post processing or machining such as cutting and/or polishing. However, it takes lots of time and labor to conduct the synthesis of single crystal and the subsequent post processing or machining of the quartz. In addition, the anisotropy of refractive index of the quartz is as small as about 0.009. In order to achieve the desired spatial cutoff frequency, it is therefore necessary to make the thickness of the quartz plate considerably great as 1–2 mm. It has hence been difficult to miniaturize and lighten the optical low-pass filter composed of the quartz plate.

As materials great in anisotropy of refractive index, there have been known calcite, rutile and the like. However, these materials are inorganic materials like quartz and hence involve a problem that it takes lots of time and labor to conduct the synthesis of their single crystals, post processing or machining of the single crystals, and the like.

On the other hand, the use of an organic material, particularly, a polymeric material permits the provision of a film having birefringence by subjecting such a material to a stretching treatment. However, it is difficult to provide any film having birefringence higher than that of quartz under stretching conditions that an optically uniform film can be obtained. In addition, there is a problem that an oriented angle cannot be established freely, and actually is fixed to about 0 degree from the film surface.

SUMMARY OF THE INVENTION

The present invention has been made in view of the foregoing circumstances and has the first object of the provision of a polymeric optical low-pass filter of the birefringent type, which has an excellent optical low-pass filtering function, and moreover can be produced with ease.

The second object of the present invention is to provide a polymeric optical low-pass filter which has an excellent optical low-pass filtering function, and moreover can be provided as a light-weight and small-sized filter.

The third object of the present invention is to provide a polymeric optical low-pass filter device (hereinafter referred to as "filter device") including the polymeric optical low-pass filter, and a production process thereof.

The fourth object of the present invention is to provide a composite optical filter including the polymeric optical low-pass filter and having a luminosity factor-compensating function.

According to the present invention, there is thus provided a polymeric optical low-pass filter comprising an optically anisotropic polymer film in which a displacement distance S between an ordinary ray and an extraordinary ray represented by the following equation (1) is 1–70 $\mu$m:

$$S=\{(b^2-a^2)/2c^2\}\cdot\sin 2\phi\cdot e \quad (1)$$

( $a=1/n_e$,
$b=1/n_o$,
$c^2=a^2 \sin^2\phi+b^2\cos^2\phi$,
$n_e$: an extraordinary-ray refractive index,
$n_o$: an ordinary-ray refractive index,
$\phi$: an angle formed between a normal at a plane of incidence of light from a subject and an optic axis (slow axis) of the polymer film, and
e: a thickness of the polymer film).

The displacement distance S in the optically anisotropic polymer film may preferably be 1–50 $\mu$m.

The anisotropy of refractive index of the optically anisotropic polymer film may be 0.01–0.35, and preferably be 0.02–0.30 at 25° C.

The angle φ formed between the normal at the plane of incidence of light from the subject and the optic axis of the optically anisotropic polymer film in the polymeric optical low-pass filter may be 10–80 degrees, and preferably be 20–70 degrees in terms of absolute value.

In the polymeric optical low-pass filter according to the present invention, the optically anisotropic polymer film may preferably be obtained by photopolymerizing a photopolymerizable liquid crystal composition comprising a monofunctional acrylate or methacrylate, which is an acrylic ester or methacrylic ester of a cyclic alcoholic compound, phenolic compound or aromatic hydroxy compound having, as a partial structure, a liquid crystal functional group with at least two 6-membered rings, and exhibiting a liquid crystal phase at room temperature.

The monofunctional acrylate or methacrylate may preferably be a compound represented by the chemical formula I, which will be described subsequently.

According to the present invention, there is also provided a polymeric optical low-pass filter device comprising plates opposing to each other, and an optically anisotropic polymer film formed between the plates, in which a displacement distance S between an ordinary ray and an extraordinary ray is 1–70 µm.

According to the present invention, there is further provided a process for producing a filter device, which comprises (a) preparing a photopolymerizable liquid crystal composition comprising a monofunctional acrylate or methacrylate, which is an acrylic ester or methacrylic ester of a cyclic alcoholic compound, phenolic compound or aromatic hydroxy compound having, as a partial structure, a liquid crystal functional group with at least two 6-membered rings, and exhibiting a liquid crystal phase at room temperature; (b) holding the photopolymerizable liquid crystal composition between plates opposing to each other to form a composite body for forming an optically anisotropic polymer film (hereinafter referred to as "composite body for forming" simply); and (c) photopolymerizing the photopolymerizable liquid crystal composition in a state that a magnetic field is applied to this composite body for forming in such a manner that the direction of lines of magnetic force toward the surface of the composite body is set at a specific angle.

According to the present invention, there is further provided a composite optical filter comprising a polymeric optical low-pass filter composed of an optically anisotropic polymer film, in which a displacement distance S between an ordinary ray and an extraordinary ray is 1–70 µm; and a luminosity factor-compensating optical filter laminated on the low-pass filter.

According to the present invention, there is still further provided a composite optical filter comprising a filter device including plates opposing to each other, and an optically anisotropic polymer film formed between the plates, in which a displacement distance S between an ordinary ray and an extraordinary ray is 1–70 µm; and a luminosity factor-compensating optical filter laminated on the low-pass filter device.

Since the polymeric optical low-pass filter according to the present invention is composed of an optically anisotropic polymer film having specific optical properties, it has an excellent function and is particularly suitable for use as an optical low-pass filter for various imaging devices.

Further, the polymeric optical low-pass filter according to the present invention has an excellent optical low-pass filtering function and moreover can be provided as a lightweight and small-sized filter with ease because its optically anisotropic polymer film is composed of a specific organic polymer. It is also easy to produce.

The filter device according to the present invention is easy to handle and can be applied to various optical instruments as it is because the optically anisotropic polymer film is interposed between the plates.

According to the production process according to the present invention, an optically anisotropic polymer film having any oriented angle may be produced by controlling the direction of lines of magnetic force toward the surface of the composite body for forming.

The composite optical filter according to the present invention combines an excellent optical low-pass filtering function with an excellent luminosity factor-compensating function.

BRIEF DESCRIPTION OF THE DRAWINGS

FIG. 3 is a schematic drawing which illustrates an exemplary means for measuring a displacement distance between an ordinary ray and an extraordinary ray.

DETAILED DESCRIPTION OF THE INVENTION AND PREFERRED EMBODIMENTS

The present invention will hereinafter be described in detail.

The optical low-pass filter according to the present invention is composed of an optically anisotropic polymer film having specific optical properties.

Figure 1:
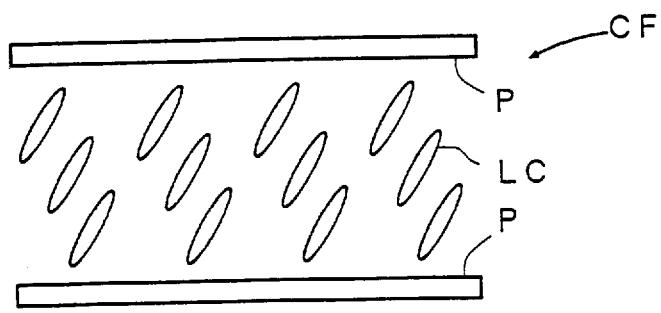
FIG. 1 is a schematic drawing which illustrates a state that liquid crystals of a liquid crystal compound in a photopolymerizable liquid crystal composition have been oriented.

Such an optically anisotropic polymer film is obtained, for example, as illustrated in FIG. 1, by arranging a pair of flat plates P, P for forming in a parallel and opposing relation to each other with a gap or space corresponding to a fixed thickness, holding a photopolymerizable liquid crystal composition comprising a liquid crystal compound having a photopolymerizable functional group in the gap between these two plates P, P to form a composite body for forming CF, and photopolymerizing the photopolymerizable liquid crystal composition in this composite body for forming CF in a state that liquid crystal molecules LC of the liquid crystal compound in the photopolymerizable liquid crystal composition have been oriented in a specific direction to the plates P, P.

In the above composite body for forming, the thickness of the gap between the two plates P, P is preset according to the intended thickness of the optically anisotropic polymer film to be formed and is generally 0.005–1 mm, preferably 0.01–0.5 mm, more preferably 0.05–0.3 mm.

The photopolymerizable liquid crystal composition preferably comprises, as the liquid crystal compound, a monofunctional acrylate or methacrylate, which is an acrylic ester or methacrylic ester of a cyclic alcoholic compound, phenolic compound or aromatic hydroxy compound having, as a partial structure, a liquid crystal functional group with at least two 6-membered rings, and exhibits a liquid crystal phase at room temperature.

As the monofunctional acrylate or methacrylate, it is preferable to use a compound represented by the following chemical formula I:

Chemical formula I:

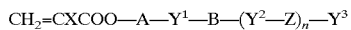

wherein X means a hydrogen atom or methyl group, A, B and Z, independently of one another, denote

or

$Y^1$ and $Y^2$, independently of each other, represent a single bond or —C≡C—, $Y^3$ means an alkyl group having 1–20 carbon atoms, and n stands for 0 or 1.

Typical specific examples of the compound represented by the chemical formula I and their phase transition temperatures are shown in the following chemical formula II. However, monofunctional acrylates or methacrylates usable in the present invention are not limited to these compounds.

Chemical formula II:

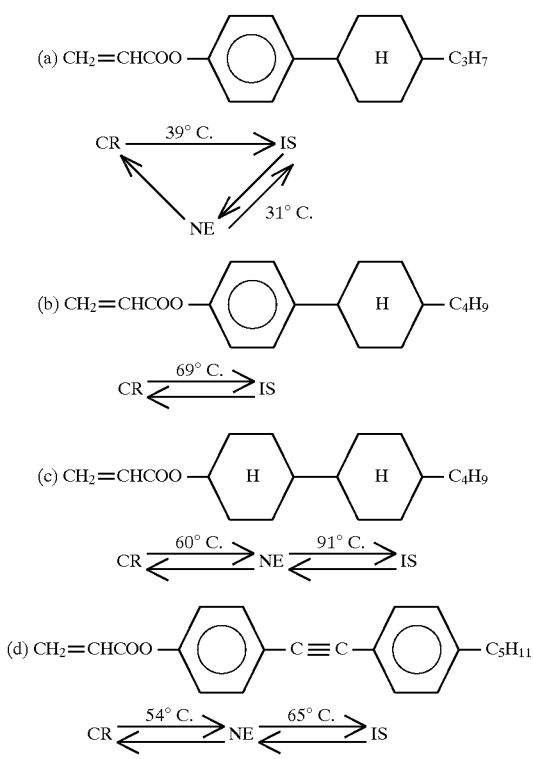

In the chemical formula II, the cyclohexane ring means a transcyclohexane ring, and in the phase transition scheme, CR, NE and IS mean a crystal phase, a nematic phase and an isotropic liquid phase, respectively. Temperatures indicated are phase transition temperatures.

As the photopolymerizable liquid crystal composition, there may preferably be used a composition prepared in such a manner that its anisotropy of refractive index is at least 0.07.

A photo-induced polymerization initiator and a sensitizer may be added with a view toward improving the polymerization reactivity of the photopolymerizable liquid crystal composition.

The photo-induced polymerization initiator may be chosen for use from, for example, known benzoin ether compounds, benzophenone compounds, acetophenone compounds, benzylketal compounds and the like.

The proportion of the photo-induced polymerization initiator to be used is preferably at most 10 mass %, particularly at most 5 mass % based on the photopolymerizable liquid crystal composition.

As the means for orienting the liquid crystals of the liquid crystal compound in the photopolymerizable liquid crystal composition, there may be used any means known in the technical field of liquid crystals. Examples thereof, may be mentioned a means in which an orienting film composed of a polyimide film or the like, which causes a pretilt angle, is formed on a plate, thereby orienting the liquid crystals, a means in which a magnetic field is applied to the photopolymerizable liquid crystal composition in such a manner that the direction of lines of magnetic force toward the surface of the composition is set in a specific direction, thereby orienting the liquid crystals, and the like.

According to the means to orient the liquid crystals by applying the magnetic field, the angle at which the liquid crystal molecules in the photopolymerizable liquid crystal composition are oriented can be controlled by controlling an angle of the direction of lines of magnetic force with the surface of the composite body for forming. As a result, an angle of the slow axis with the thickness direction of the resulting optically anisotropic polymer film can be freely controlled over a wide range. It is hence preferable to use such a means.

As materials constituting the plates for the composite body for forming, either organic materials or inorganic materials may be used.

Specific examples of the organic materials includes polyethylene terephthalate, polycarbonate, polyimide, polymethyl methacrylate, polystyrene, polyethylene, polyvinyl chloride, polytetrafluoroethylene, polychlorofluoroethylene, polyarylate, polysulfone, cellulose and poly(ether ether ketone).

Specific examples of the inorganic materials include silicon and glass.

As materials constituting the plates for the composite body for forming, there may be used materials having an optical luminosity factor-compensating function. In this case, a composite optical filter which combines an optical low-pass filtering function with a luminosity factor-compensating function may be provided by a simple process without removing the plates.

The photopolymerization reaction may preferably be conducted by irradiating energy rays such as ultraviolet rays or electron rays as light for polymerization reaction. In this manner, at least one of the two plates in the composite body for forming, through which the energy rays are irradiated, must have appropriate transmittance to the energy rays applied.

The temperature of the photopolymerization reaction must be kept at a temperature within a range in which a liquid crystal state of the photopolymerizable liquid crystal composition as used is maintained. However, a temperature near room temperature as low as possible is preferably selected.

In the above-described manner, the filter device comprising the two plates and the optically anisotropic polymer film interposed between these plates, the slow axis of said polymer film forming a specific angle with the thickness direction of said polymer film, can be provided. This filter device can be used as an optical low-pass filter as it is. Only the optically anisotropic polymer film formed of the polymer can be taken out by removing the plates from the filter device. This film can be applied as an optically low-pass filter to any optical instrument as it is or in combination with other appropriate parts.

With respect to the above optically anisotropic polymer film, its birefringence, i.e., the anisotropy of refractive index, is preferably greater. Specifically, the lower-limit value of the anisotropy of refractive index is preferably greater than the anisotropy of refractive index (0.009) as to quartz, for example, at least 0.01, particularly at least 0.02. This permits sufficient miniaturization of the optical low-pass filter, and such a filter suitably serves as an optical low-pass filter for imaging devices.

On the other hand, the upper-limit value of the anisotropy of refractive index in the present invention is preferably at most 0.35, particularly at most 0.30 from the viewpoint of stability of the liquid crystals and the like.

In the present invention, the displacement distance S between the ordinary ray and the extraordinary ray in the optically anisotropic polymer film is established to a magnitude corresponding to at most one picture element or so due to an imaging device such as a CCD or MOS device, and hence within a range of 1–70 $\mu$m, preferably 1–50 $\mu$m. Thus, this optically anisotropic polymer film suitably serves as an optical low-pass filter member for imaging devices.

The displacement distance S between the ordinary ray and the extraordinary ray, i.e., the spatial cutoff frequency of an optical low-pass filter, is determined by setting conditions such as the anisotropy of refractive index of the optically anisotropic polymer film, an angle of the slow axis with the thickness direction in the optically anisotropic polymer film, namely, the oriented angle $\phi$, and the thickness of the optically anisotropic polymer film.

The oriented angle $\phi$ is preset within a range of 10–80 degrees, preferably 20–70 degrees, more preferably 30–60 degrees in terms of absolute value. If the absolute value of the oriented angle $\phi$ is too small or too great, it is necessary to make the thickness of the optically anisotropic polymer film greater in order to obtain necessary properties.

The thickness of the optically anisotropic polymer film varies according to the degrees of the oriented angle $\phi$ and anisotropy of refractive index of the optically anisotropic polymer film. However, it is generally 0.005–1 mm, preferably 0.01–0.5 mm, more preferably 0.05–0.3 mm. The resulting optical low-pass filter tends to have a lower light transmittance as the thickness of the optically anisotropic polymer film increases. From this point of view, it is preferable that the thickness be small.

Such an optically anisotropic polymer film may be used as an optical low-pass filter by itself solely or in layers of a plurality of the films as needed. The filter device may also be used in layers of a plurality of the filter devices.

According to the present invention, the optical low-pass filter can be laminated on, for example, a surface of a luminosity factor-compensating filter, thereby obtaining a composite optical filter having the functions of both filters.

As the luminosity factor-compensating filter used in this composite optical filter, that made of glass or plastic may be used.

Examples of the luminosity factor-compensating filter made of glass include filters (C-500S, C-5000, etc., products of HOYA Corporation) in which a copper ion is introduced in phosphate glass material, and the like. Examples of the luminosity factor-compensating filter made of plastic include optical filters (Japanese Patent Application Laid-Open No. 118228/1994) comprising a copolymer obtained by polymerizing a monomer mixture of a phosphate group-containing acrylic monomer and a monomer or monomers copolymerizable with this acrylic monomer, and a metal salt composed mainly of a copper salt, and the like. However, such filters are not limited to these filters.

An appropriate optical compensator can be combined with the polymeric optical low-pass filter according to the present invention, thereby obtaining a composite optical filter having characteristics by which ordinary rays and extraordinary rays of light from a subject are equalized in intensity. A common quarter-wave plate may be used as such an optical compensator. It is also effective to use a depolarizing plate so as not to polarize light. As these wave plates, quartz plates are generally used. However, plates made of a polymer such as polycarbonate or polyvinyl alcohol may also be used.

In order to integrally laminate any two or more layers of the polymeric optical low-pass filter, compensator and/or luminosity factor-compensating filter on one another, it is preferable to fix lamination interfaces with an adhesive or pressure-sensitive adhesive. This prevents the reflection of incident light at an air layer in the lamination interface. As a result, the occurrence of ghost can be prevented, and moreover the necessary quantity of light incident on an imaging device can be ensured.

As such an adhesive, there may preferably be used an adhesive of the thermosetting or photosetting type, which has excellent light transmission property, for example, an epoxy adhesive, urethane adhesive or acrylic adhesive. As the pressure-sensitive adhesive, an acrylic pressure-sensitive adhesive may preferably be used from the viewpoint of weathering resistance.

In the present invention, as needed, a nonreflective coating layer may be formed by a vacuum deposition process, dipping process or the like on one or both of the respective two surfaces of the polymeric optical low-pass filter or composite optical filter, through which light from a subject passes, in order to further enhance the light transmittances of these filters.

In the polymeric optical low-pass filter or filter device composed of the optically anisotropic polymer film, or the composite optical filter composed of the optical low-pass filter, such a polymer film is extremely small in thickness. Therefore, such filters can be made lighter in weight and smaller in thickness than any conventionally used optical low-pass filter made of quartz and the composite optical filter composed of a combination of the conventional low-pass filter and a luminosity factor-compensating filter, and hence can greatly contribute to miniaturization and lightening of instruments, such as video cameras, making good use of imaging devices such as CCDs and MOS devices.

The present invention will hereinafter be described by the following examples. However, this invention is not limited to and by these examples.

All designations of "part" or "parts" as will be used in the following examples mean part or parts by mass.

EXAMPLE 1

A polymerizable liquid crystal composition (A1) composed of 50 parts of a compound represented by the chemical formula II(a) and 50 parts of a compound represented by the chemical formula II(d) was prepared. This polymerizable liquid crystal composition (A1) showed a nematic phase at room temperature, and its phase transition temperature from the nematic phase to an isotropic liquid phase was 47° C.

Its refractive index at 25° C. was measured by an Abbe's refractometer (2T Model, manufactured by Atago K.K.). As a result, its extraordinary-ray refractive index $n_e$ and ordinary-ray refractive index $n_0$ were 1.663 and 1.511, respectively. The anisotropy of refractive index ($n_e$-$n_o$) was thus 0.152.

Figure 2:
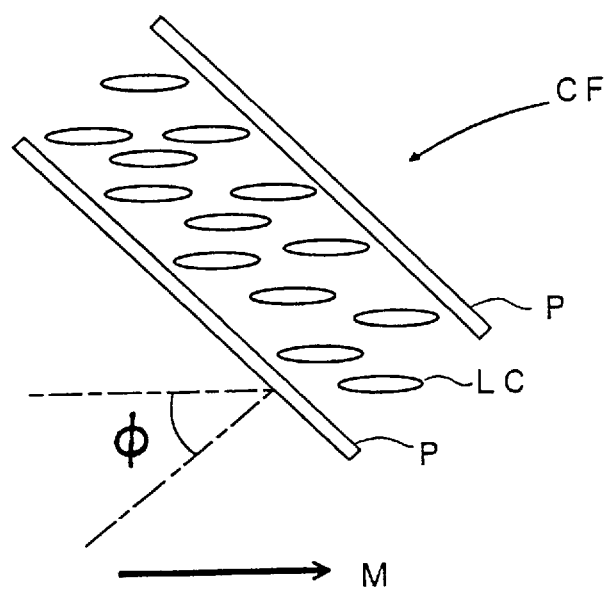
FIG. 2 is a schematic drawing which illustrates an exemplary means for orienting liquid crystals of the liquid crystal compound in the photopolymerizable liquid crystal composition.

One part of a photo-induced polymerization initiator "Irgacure 651" (product of Ciba-Geigy AG.) was added to 100 parts of this polymerizable liquid crystal composition (A1) to prepare a photopolymerizable liquid crystal composition (A2). This photopolymerizable liquid crystal composition (A2) was held between a pair of polycarbonate plates for forming arranged in a parallel and opposing relation to each other with a gap of 0.1 mm, thereby forming a composite body for forming. As illustrated in FIG. 2, the composite body for forming FC was left at rest for 1 minute in a magnetic field having intensity of 8 KG in a state inclined in such a manner that an angle θ of a normal at a surface of the composite body for forming FC with the direction M of lines of magnetic force was 45 degrees, and then exposed to ultraviolet light having intensity of 1 mW/cm² at room temperature for 5 minutes by means of an ultraviolet lamp ("UVGL-25", product of UVP Co.), thereby subjecting the photopolymerizable liquid crystal composition (A2) to a polymerization treatment to produce a composite film.

The composite film thus produced was held at a temperature of 150° C. for 10 minutes and then cooled to room temperature, and the resultant optically anisotropic polymer film was then taken out of the two plates for forming.

An oriented angle ϕ of this optically anisotropic polymer film was determined by measuring a change in retardation to an incident angle of a measuring ray by means of a pretilt angle measuring device and found to be 45 degrees. Its extraordinary-ray refractive index $n_e$ and ordinary-ray refractive index no were 1.646 and 1.542, respectively, and accordingly the anisotropy of refractive index ($n_e$-$n_o$) was 0.104.

In order to determine the performance of this optically anisotropic polymer film as an optical low-pass filter, the optically anisotropic polymer film F1 and a standard film F2 obtained by stamping a fine line on a surface of a polyethylene terephthalate film were set under a microscope as illustrated in FIG. 3, thereby measuring a displacement distance as to the fine line stamped on the standard film F2. In FIG. 3, reference characters L and K designate an objective lens of the microscope and a light source, respectively. The displacement distance was 7 μm.

EXAMPLE 2

A polymerizable liquid crystal composition (B1) composed of 33.3 parts of a compound represented by the chemical formula II(a), 33.3 parts of a compound represented by the chemical formula II(c) and 33.3 parts of a compound represented by the chemical formula II(d) was prepared. This polymerizable liquid crystal composition (B1) showed a nematic phase at room temperature, and its phase transition temperature from the nematic phase to an isotropic liquid phase was 54° C. On the other hand, its anisotropy of refractive index was 0.126 at 25° C.

A photopolymerizable liquid crystal composition (B2) was prepared in the same manner as in Example 1 except that the polymerizable liquid crystal composition (B1) was used in place of the polymerizable liquid crystal composition (A1), thereby producing an optically anisotropic polymer film.

An oriented angle ϕ and anisotropy of refractive index of this optically anisotropic polymer film were determined in the same manner as in Example 1. As a result, the oriented angle ϕ and the anisotropy of refractive index were 45 degrees and 0.071, respectively. Besides, a displacement distance as to the fine line stamped on the standard film F2 was measured in the same manner as in Example 1 and found to be 5 μm.

EXAMPLE 3

A polymerizable liquid crystal composition (C1) composed of 50 parts of a compound represented by the chemical formula II(a) and 50 parts of a compound represented by the chemical formula II(c) was prepared. This polymerizable liquid crystal composition (C1) showed a nematic phase at room temperature, and its phase transition temperature from the nematic phase to an isotropic liquid phase was 57° C. On the other hand, its anisotropy of refractive index was 0.075 at 25° C.

An optically anisotropic polymer film was produced in the same manner as in Example 1 except that the polymerizable liquid crystal composition (C1) was used in place of the polymerizable liquid crystal composition (A1) to prepare a polymerizable liquid crystal composition (C2), and this photopolymerizable liquid crystal composition (C2) was held between a pair of plates for forming arranged in an opposing relation to each other with a gap of 0.2 mm to obtain a composite body for forming.

An oriented angle ϕ and anisotropy of refractive index of this optically anisotropic polymer film were determined in the same manner as in Example 1. As a result, the oriented angle ϕ and the anisotropy of refractive index were 45 degrees and 0.043, respectively. Besides, a displacement distance as to the fine line stamped on the standard film F2 was measured in the same manner as in Example 1 and found to be 6 μm.

EXAMPLE 4

An optically anisotropic polymer film was produced in the same manner as in Example 1 except that in the polymerization treatment of the photopolymerizable liquid crystal composition (A2), the composite body for forming was held in a state inclined in such a manner that an angle θ of a normal at a surface of the composite body of forming with the direction of lines of magnetic force was 10 degrees.

An oriented angle ϕ and anisotropy of refractive index of this optically anisotropic polymer film were determined in the same manner as in Example 1. As a result, the oriented angle ϕ and the anisotropy of refractive index were 10 degrees and 0.104, respectively. Besides, a displacement distance as to the fine line stamped on the standard film F2 was measured in the same manner as in Example 1 and found to be 2 μm.

EXAMPLE 5

An optically anisotropic polymer film was produced in the same manner as in Example 1 except that in the polymerization treatment of the photopolymerizable liquid crystal composition (A2), the composite body for forming was held in a state inclined in such a manner that an angle θ of a normal at a surface of the composite body of forming with the direction of lines of magnetic force was 30 degrees.

An oriented angle φ and anisotropy of refractive index of this optically anisotropic polymer film were determined in the same manner as in Example 1. As a result, the oriented angle φ and the anisotropy of refractive index were 30 degrees and 0.104, respectively. Besides, a displacement distance as to the fine line stamped on the standard film F2 was measured in the same manner as in Example 1 and found to be 5 μm.

EXAMPLE 6

An optically anisotropic polymer film was produced in the same manner as in Example 1 except that in the polymerization treatment of the photopolymerizable liquid crystal composition (A2), the composite body for forming was held in a state inclined in such a manner that an angle θ of a normal at a surface of the composite body of forming with the direction of lines of magnetic force was 50 degrees.

An oriented angle φ and anisotropy of refractive index of this optically anisotropic polymer film were determined in the same manner as in Example 1. As a result, the oriented angle φ and the anisotropy of refractive index were 50 degrees and 0.104, respectively. Besides, a displacement distance as to the fine line stamped on the standard film F2 was measured in the same manner as in Example 1 and found to be 7 μm.

EXAMPLE 7

An optically anisotropic polymer film was produced in the same manner as in Example 1 except that in the polymerization treatment of the photopolymerizable liquid crystal composition (A2), the composite body for forming was held in a state inclined in such a manner that an angle θ of a normal at a surface of the composite body of forming with the direction of lines of magnetic force was 70 degrees.

An oriented angle φ and anisotropy of refractive index of this optically anisotropic polymer film were determined in the same manner as in Example 1. As a result, the oriented angle φ and the anisotropy of refractive index were 70 degrees and 0.104, respectively. Besides, a displacement distance as to the fine line stamped on the standard film F2 was measured in the same manner as in Example 1 and found to be 4 μm.

COMPARATIVE EXAMPLE 1

An optical low-pass filter was produced from a quartz plate having a thickness of 1 mm, whereby a displacement distance as to the fine line stamped on the standard film F2 was measured in the same manner as in Example 1. As a result, it was found to be 6 μm.

As described above, it was confirmed that the optical low-pass filter formed of the quartz plate requires a quartz plate extremely greater in thickness than the optically anisotropic polymer film according to the present invention to make its displacement distance between an ordinary ray and an extraordinary ray equal to that of the optical low-pass filter formed of the optically anisotropic polymer film.

EXAMPLE 8

The optically anisotropic polymer film obtained in Example 1 was integrally laminated on one side of a commercially-available plastic luminosity factor-compensating filter ("UCF-40", product of Kureha Kagaku Kogyo K.K.) with a photosetting acrylic adhesive to obtain a composite optical filter.

In order to determine the function of this composite optical filter as an optical low-pass filter, a displacement distance as to the fine line stamped on the standard film F2 was measured in the same manner as in Example 1. As a result, it was confirmed that the distance was 7 ηm, and the performance of the optically anisotropic polymer film according to Example 1 was hence maintained.

Besides, the spectral transmittances of this composite optical filter were measured. As a result, it was confirmed that the transmittances in a visible region were as high as at least 60%, and so the optical filter was excellent in transparency, while the light transmittances in near infrared region (700–1,000 nm in wavelength) were not higher than 10%, and so the optical filter absorbs rays in the wavelength range of the near infrared region with high efficiency.

EXAMPLE 9

Three optically anisotropic polymer films were produced in the same manner as in Example 1 and laminated on one another with a commercially-available photosetting transparent acrylic adhesive in a state that the slow axes of the respective films run parallel to one another, thereby obtaining a laminated optical low-pass filter. With respect to this optical low-pass filter, a displacement distance as to the fine line stamped on the standard film F2 was measured in the same manner as in Example 1. As a result, the displacement distance was 22 μm and hence about three times larger than that of the optically anisotropic polymer film obtained in Example 1.

What is claimed is:

1. A polymeric optical low-pass filter comprising an optically anisotropic polymer film in which the displacement distance S between the ordinary ray and the extraordinary ray represented by the following equation (1) is 1–70 μm:

$$S=\{(b^2-a^2)/2c^2\}\cdot\sin 2\phi\cdot e \qquad (1),$$

wherein
 $a=1/n_e$,
 $b=1/n_o$,
 $c^2=a^2\sin^2\phi+b^2\cos^2\phi$,
 $n_e$ is the extraordinary-ray refractive index,
 $n_o$ is the ordinary-ray refractive index,
 φ is the angle formed between the normal at the plane of incidence of light from a subject and the optic axis of the polymer film, and
 e is the thickness of the polymer film,
 the optically anisotropic polymer film being produced by photopolymerizing a photopolymerizable liquid crystal composition containing a liquid crystal compound which exhibits a liquid crystal phase at room temperature in a state that liquid crystal molecules of the liquid crystal compound in the liquid crystal composition have been oriented in a specific direction by applying a magnetic field.

2. The polymeric optical low-pass filter according to claim 1, wherein the displacement distance S of the optically anisotropic polymer film is 1–50 μm.

3. The polymeric optical low-pass filter according to claim 1, wherein the anisotropy of refractive index of the optically anisotropic polymer film is 0.01–0.35 at 25° C.

4. The polymeric optical low-pass filter according to claim 1, wherein the anisotropy of refractive index of the optically anisotropic polymer film is 0.02–0.30 at 25° C.

5. The polymeric optical low-pass filter according to claim 1, wherein the angle φ formed between the normal at the plane of incidence of light from the subject and the optical axis of the optically anisotropic polymer film is 10–80 degrees in terms of absolute value.

6. The polymeric optical low-pass filter according to claim 1, wherein the angle φ formed between the normal at the plane of incidence of light from the subject and the optical axis of the optically anisotropic polymer film is 20–70 degrees in terms of absolute value.

7. The polymeric optical low-pass filter according to claim 6, wherein the angle is 30° to 60°.

8. The polymeric optical low-pass filter according to claim 7, wherein the displacement distance is 1 to 50 μm; the anisotropy of the refractive index of the optically anisotropic polymer film is 0.02 to 0.30 at 25° C.; and the thickness of the optically anisotropic polymer film is 0.005 to 1 mm.

9. The polymeric optical low-pass filter according to claim 1, wherein the thickness of the optically anisotropic polymer film is 0.05 to 0.3 mm.

10. The polymeric optical low-pass filter according to claim 1, wherein the optically anisotropic polymer film is obtained by photopolymerizing a photopolymerizable liquid crystal composition comprising a monofunctional acrylate or methacrylate, which is an acrylic ester or methacrylic ester of a cyclic alcoholic compound, phenolic compound or aromatic hydroxy compound having, as a partial structure, a liquid crystal functional group with at least two 6-membered rings, and exhibiting a liquid crystal phase at room temperature.

11. The polymeric optical low-pass filter according to claim 10, wherein the monofunctional acrylate or methacrylate is a compound represented by the following chemical formula I:

$$CH_2=CXCOO—A—Y^1—B—(Y^2—Z)_n—Y^3$$

wherein X is a hydrogen atom or a methyl group, A, B and Z, independently of each other, is

[benzene ring structure]

or

[cyclohexane ring structure with H], $Y^1$ and $Y^2$, independently of each other, is a single bond or —C≡C—, $Y^3$ is an alkyl group having 1–20 carbon atoms, and n is 0 or 1.

12. The polymeric optical low-pass filter according to claim 11, wherein the compound is selected from the group consisting of $CH_2=CHCOO$—[benzene]—[cyclohexane H]—$C_3H_7$, $CH_2=CHCOO$—[benzene]—[cyclohexane H]—$C_4H_9$, -continued $CH_2=CHCOO$—[cyclohexane H]—[cyclohexane H]—$C_4H_9$ and $CH_2=CHCOO$—[benzene]—C≡C—[benzene]—$C_5H_{11}$.

13. A polymeric optical low-pass filter device comprising plates which oppose each other, and an optically anisotropic polymer film formed between the plates, in which the displacement distance S between the ordinary ray and the extraordinary ray is 1–70 μm.

14. The polymeric optical low-pass filter device according to claim 13, wherein a gap of 0.005 to 1 mm is between the plates.

15. A process for producing a polymeric optical low-pass filter device, which comprises:

(a) preparing a photopolymerizable liquid crystal composition comprising a monofunctional acrylate or methacrylate, which is an acrylic ester or methacrylic ester of a cyclic alcoholic compound, a phenolic compound or an aromatic hydroxy compound having, a liquid crystal functional group with at least two 6-membered rings, and which exhibits a liquid crystal phase at room temperature;

(b) maintaining the photopolymerizable liquid crystal composition between plates which oppose each other to form a composite body for forming an optically anisotropic polymer film; and (c) photopolymerizing the photopolymerizable liquid crystal composition and applying a magnetic field to the composite body such that the direction of lines of magnetic force toward the surface of the composite body is set at a specific angle.

16. A composite optical filter comprising:

(a) a polymeric optical low-pass filter comprising an optically anisotropic polymer film, in which the displacement distance S between the ordinary ray and the extraordinary ray is 1–70 μm; and (b) a luminosity factor-compensating optical filter laminated on the low-pass filter.

17. The process according to claim 15, wherein step (c) is carried out at about room temperature.

18. A composite optical filter comprising:

(a) a polymeric optical low-pass filter device including (i) plates which oppose each other, and (ii) an optically anisotropic polymer film formed between the plates, in which the displacement distance S between the ordinary ray and the extraordinary ray is 1–70 μm; and (b) a luminosity factor-compensating optical filter laminated on the low-pass filter device.

19. The composite optical filter according to claim 13, wherein a gap of 0.005 to 1 mm is between the plates.

* * * * *